INVENTORS:
STEFAN NADASAN
PAUL SULEA
DUMITRU POPESCU
CAROL SCHAUMBURGER
COLOMAN BAKONYI

Attorney: Karl G. Ross

United States Patent Office 3,450,236
Patented June 17, 1969

3,450,236
COMPOSITION MATERIAL FOR RAILWAY VEHICLE BRAKE SHOES AND A METHOD OF FABRICATION OF BRAKE SHOES
Stefan Nadasan, Str. Tusnad nr. 26, and Paul Sulea, Str. Vilcea nr. 4, both of Timisoara, Rumania, and Dumitru Popescu, Str. T. Vladimirescu nr. 10A, Carol Schaumburger, Str. Eminescu nr. 36, and Coloman Bakonyi, Str. Ghiba-Birta nr. 10, all of Arad, Rumania
Filed July 5, 1967, Ser. No. 651,288
Claims priority, application Rumania, July 7, 1966, 51,830
Int. Cl. F16d 69/00, 11/00, 13/60
U.S. Cl. 188—251                          8 Claims

ABSTRACT OF THE DISCLOSURE

A brakeshoe-lining composition consisting of 18 to 26% by weight novolak phenol-formaldehyde resin, 2 to 3% hexamethylenetetramine, 22 to 42% by weight asbestos flakes, 8 to 16% by weight kaolin, 9 to 17% by weight small-grain rubber flakes of less than 1 mm. mesh from automobile-tire rubber and the balance graphite (0 to 41% by weight), the composition being bonded to a steel spine and subjected to compression at about 400 to 500 kp./cm.$^2$ at 150° C. to 160° C. for about 30 minutes to yield a wear-resistant layer with a frictional coefficient of about 0.2 to 0.4.

---

The invention relates to a composition material with good frictional characteristics for railway-vehicle brakeshoes (e.g. for railway locomotives and cars, tramway and subway cars) and to a method of fabrication of brakeshoes.

Known materials for the manufacture of brakeshoes for railway cars include several composition materials based either on synthetic resins or on synthetic rubbers with asbestos, abrasives, and metallic particles as fillers.

These composition materials have some shortcomings: the coefficient of friction of the composition brakeshoes is greater than that of the cast-iron shoes so that the brake transmission must be modified when using prior composition shoes and their wear resistance is poor. It has also been pointed out that wheels equipped with these brakes showed an abnormal wear of the wheel surface (circular grooves up to 2.5 mm. deep and 20 mm. wide), and in case of sudden braking, locking of the wheels occurred.

It is, therefore, the principal object of our present invention to provide an improved composition material for use as a lining for a railway-vehicle brakeshoe whereby the aforementioned disadvantages can be avoided.

Another object of our invention is to provide an improved method of making composition brakeshoes of the character described to eliminate the shortcomings of earlier techniques.

The present invention provides that a composition consisting predominantly of novolak resin, asbestos flakes, kaolin graphite and small-grain rubber flakes be pressed under elevated temperature to yield a brake lining with a frictional coefficient of about 0.2 to 0.4.

These shortcomings are eliminated by composition brakeshoes manufactured according to the invention; the composition makes use of a mixture of: novolak (phenol-formaldehyde)=18 to 26% by weight; hexamethylentetramine=2 to 3% by weight; asbestos flakes=22 to 42% by weight; kaolin=8 to 16% by weight, rubber flakes (obtained from the fabrication of automobile tires) with small grain size (sieves mesh dimension below 1 mm.)=9 to 17% by weight and concentrated graphite=0 to 41% by weight and making up the balance of the composition. The brakeshoes are manufactured by pressurizing this mixture at 40 to 50 mn./m.$^2$ ($\approx$400 to 500 kp./cm.$^2$ in dies heated to 150 to 160° C. over a period of 30 minutes.

The above and other objects, features and advantages of the present invention will become more readily apparent from the following description, reference being made to the accompanying drawing in which.

Figure 1:
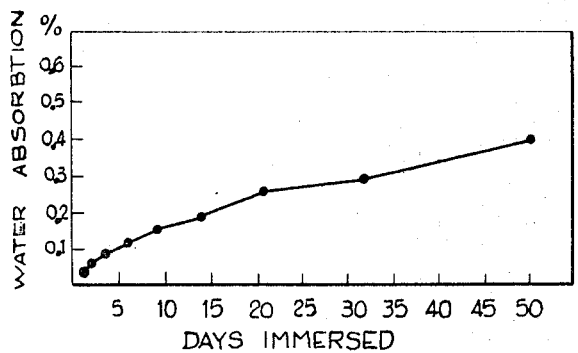
FIG. 1 is a graph of the water absorption of the present brake lining material plotted in percent by weight along the ordinate against days of immersion along the abscissa and demonstrating characteristics of the composition.
Figure 2:
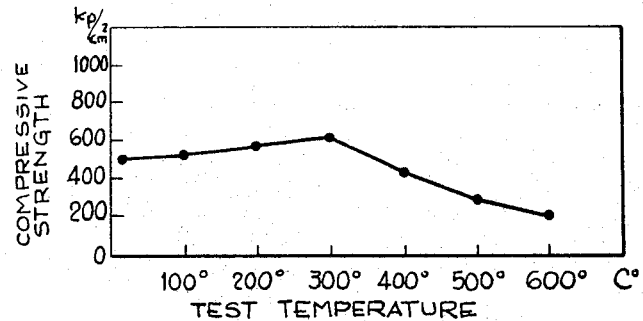
FIG. 2 is a graph of the compressive strength (plotted along the ordinate) against temperature (plotted along the abscissa) for the composition.
Figure 3:
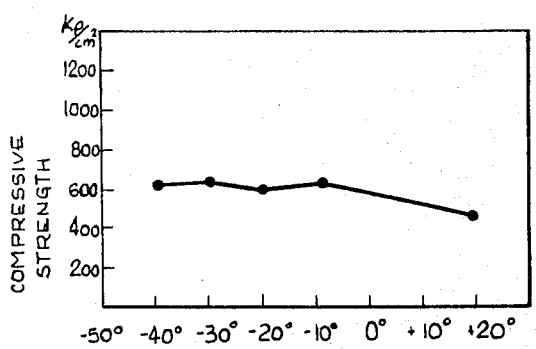
FIG. 3 is a graph of the compressive strength (plotted along the abscissa) against temperature (plotted along the abscissa) for a lower temperature range.

FIG. 1 shows the water-absorption characteristics of the composition of the present invention generally described above after immersion for a number of days. It is important to note that the water absorption is negligible (i.e. less than 0.5%) even after 50 days of immersion. The product has a Brinell hardness of about 1.5 mn./m.$^2$ ($\approx$15 kp./cm.$^2$). The compressive strength of the composition at various temperatures is represented in FIGS. 2 and 3, the former representing temperatures which may be attained during use of the lining. Even at temperatures as high as 600° C. (FIG. 2), the compressive strength remains well above the pressure of the shoe against the wheels (0.4 to 1.5 mn./m.$^2$ or $\approx$4 to 15 kp./cm.$^2$).

It has also been found that storage of the brake linings or shoes for prolonged periods has little, if any, detrimental effect. As a matter of fact, it has been found that, after a year and a half of shelf life, the frictional characteristics, i.e. wear resistance and coefficient of friction, showed no significant change.

EXAMPLE I

Figure 4B:
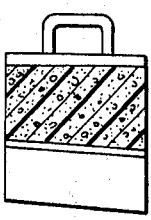
FIG. 4B is a cross-section taken along the line IVB—IVB.
Figure 4A:
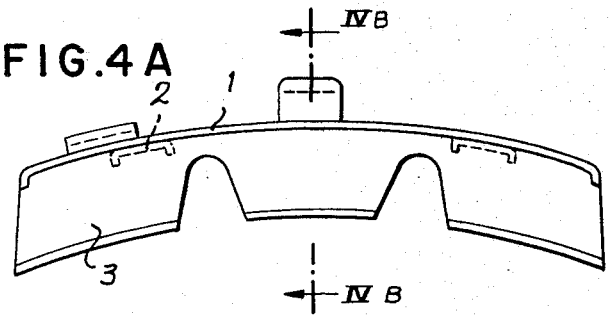
FIG. 4A is an elevational view of a brakeshoe in accordance with the present invention.

A mixture consisting of:                Percent by weight
    Novolak (phenol-formaldehyde resin) _____ 23
    Hexamethylentetramine _____  2
    Asbestos flakes _____ 27
    Kaolin _____ 10
    Rubber flakes (small grains) _____ 12
    Concentrated graphite _____ 26 is pressurized at a specific pressure of 40 to 50 mn./m.$^2$ ($\approx$400 to 500 kp./cm.$^2$) in chrome-plated dies heated at 150 to 160° C. over a period of 30 minutes. Brakeshoes for railway vehicles (locomotives and cars) are obtained, their wear resistance being 4 to 6 times greater than that of cast-iron shoes of similar geometric shape; the coefficient of friction amounts to 0.20. The shoes (FIGS. 4A and 4B) are equipped with a steel armature 1 placed on the surface opposite to the friction face to ensure their shock resistance, and with two baffle plates 2 fixed on the inner side of the armature, to increase the adhesion between the brakeshoes 3 and the armature.

EXAMPLE II

Another mixture of:                       Percent by weight
    Novolak _____ 23
    Hexamethylentetramine _____  2
    Asbestos flakes _____ 42
    Kaolin _____ 16
    Rubber flakes (small grains) _____ 17 is pressurized at a specific pressure of 40 to 50 mn./m.$^2$ ($\approx$400 to 500 kp./cm.$^2$) in chome-plated dies heated to 150 to 160° C. over a period of 30 minutes. The wear resistance of the tramway brakeshoes thus obtained is about 4 times greater than that of the cast-iron brakeshoes, the coefficient of friction being about 0.4.

We claim:
1. A composition for use as a brakeshoe lining, consisting essentially of 18 to 26% by weight novolak phenol-formaldehyde resin, 2 to 3% hexamethylenetetramine polymerized with said novolak, 22 to 42% by weight asbestos flakes, 8 to 16% by weight kaolin, 9 to 17% by weight small-grain rubber flakes, and the balance graphite in an amount up to 41% by weight.

2. The composition defined in claim 1 which consists of 23% by weight novolak phenol-formaldehyde resin, 2% by weight hexamethylenetetramine, 27% by weight asbestos flakes, 10% by weight kaolin, 12% by weight rubber flakes of automobile-tire rubber with a particle size of less than 1 mm., and 26% by weight graphite, said composition being subjected to a pressure of substantially 400 to 500 kp./cm.$^2$ at a temperature of substantially 150° to 160° C. for a period of about 30 minutes and having a coefficient of friction of substantially 0.2.

3. The composition defined in claim 1 consisting essentially of 23% by weight novolak phenol-formaldehyde resin, 2% by weight hexamethylenetetramine, 42% by weight asbestos flakes, 15% by weight kaolin and 17% by weight rubber flakes of automobile-tire rubber with a particle size of less than 1 mm., the composition being subjected to pressure at substantially 400 to 500 km./cm.$^2$ at a temperature of substantially 150 to 160° C. for a period of about 30 minutes and having a coefficient of friction of about 0.4.

4. A brakeshoe lining for railway-car brakes composed of the composition defined in claim 1 having a coefficient of friction of substantially 0.2 to 0.4, a water absorption of less than 0.5% by weight after 50 days of immersion in water, and a Brinell hardness of at least about 15 kp./cm.$^2$ 5. The brakeshoe defined in claim 4 comprising a steel support extending generally along a sector of a cylindrical surface and bonded to said composition, said composition forming a brake lining on said support, said lining being subjected to a pressure of substantially 400 to 500 kp./cm.$^2$ at a temperature of 150° to 160° C. for a period of substantially 30 minutes, said support being provided with formations extending into said layer for retaining same on said support, said rubber flakes having a mesh size less than 1 mm. and being composed of ground automobile-tire rubber.

6. A method of making a brakeshoe for railway cars, comprising the steps of forming the composition defined in claim 1 by mixing novolak phenol-formaldehyde resin, hexamethylenetetramine, asbestos flakes, kaolin and rubber flakes composed of ground automobile-tire rubber with a mesh size less than 1 mm.; and pressing said composition against a steel support of cylindrical sectoral configuration to form a brake lining thereof of arcuate configuration at a pressure of substantially 400 to 500 kp./cm.$^2$ at a temperature of substantially 150° to 160° C. for a period of about 30 minutes.

7. The method defined in claim 6 wherein up to 41% by weight of graphite is included in said composition.

8. The method defined in claim 6 wherein said lining, after compression at said pressure and said temperature, has a water absorption of less than 0.5% after 50 days immersion in water, a Brinell hardness of at least about 50 kp./cm.$^2$, a compressive strength as represented in FIG. 2 or FIG. 3 wherein the compressive strength is plotted along the ordinate and the temperature of the lining is plotted along the abscissa and a friction coefficient of substantially 0.2 to 0.4.

References Cited

UNITED STATES PATENTS

| | | | |
|---|---|---|---|
| 2,910,449 | 10/1959 | Evans | 260—38 |
| 3,226,365 | 12/1965 | Yamamoto | 260—38 X |
| 3,344,094 | 9/1967 | de Gaugue | 188—251 X |

GEORGE E. A. HALVOSA, *Primary Examiner.*

U.S. Cl. X.R.

192—107; 260—3, 38